May 26, 1936.  L. O. ORNER  2,041,857
SAFETY HITCH
Filed Oct. 12, 1935  3 Sheets—Sheet 2
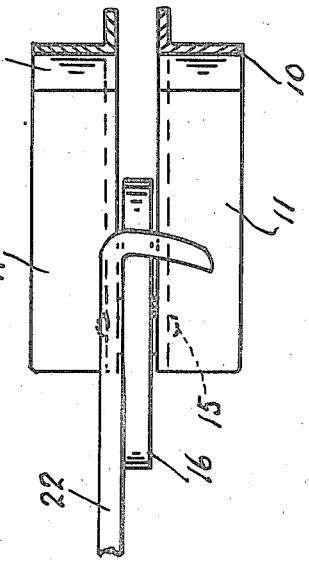
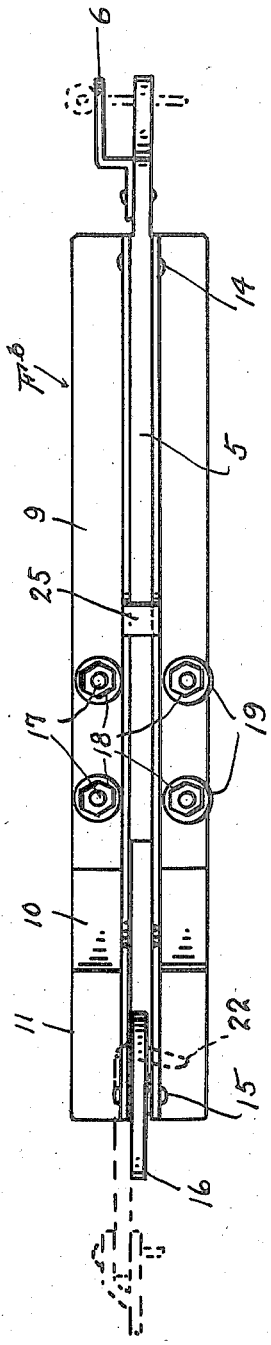
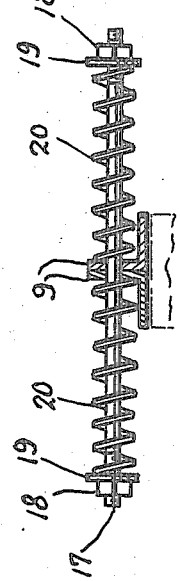
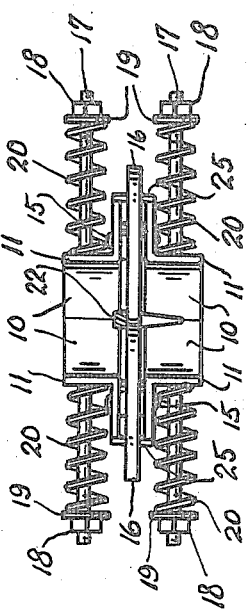
Inventor
L. O. Orner
By Clarence A. O'Brien
Attorney May 26, 1936.  L. O. ORNER  2,041,857
SAFETY HITCH
Filed Oct. 12, 1935  3 Sheets-Sheet 3
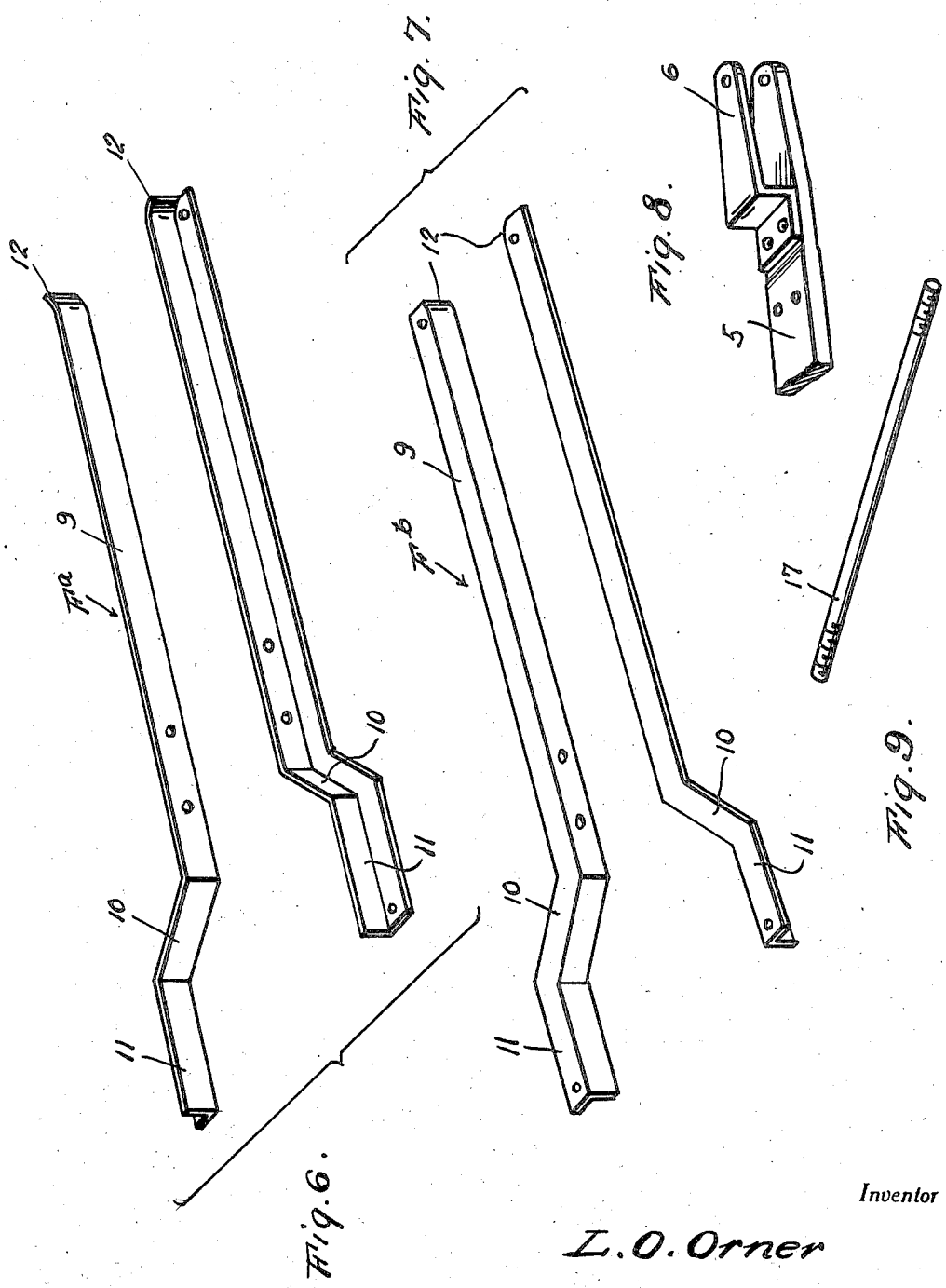
Inventor
*L. O. Orner*
By *Clarence A. O'Brien*
Attorney Patented May 26, 1936

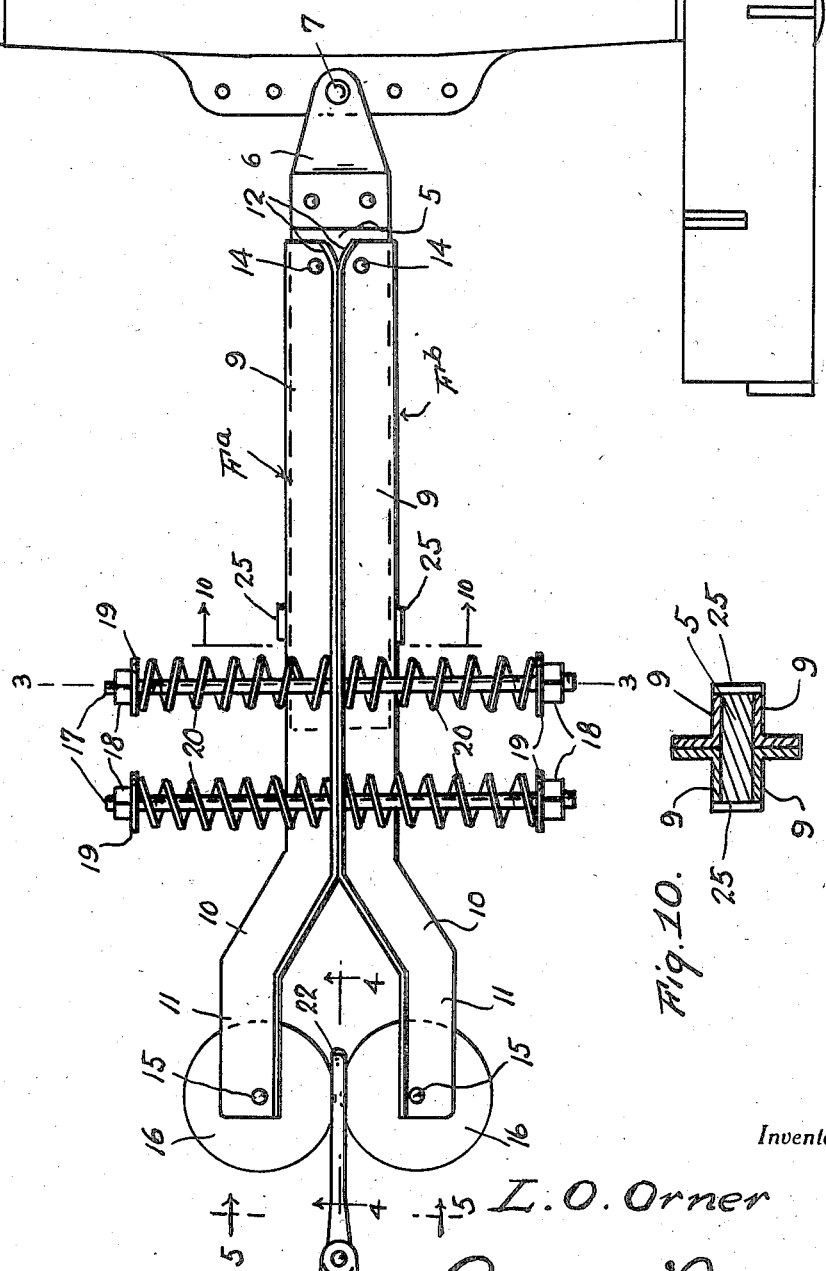

2,041,857

UNITED STATES PATENT OFFICE 2,041,857

SAFETY HITCH

Leonas O. Orner, Maddock, N. Dak.

Application October 12, 1935, Serial No. 44,772

1 Claim. (Cl. 280—33.16)

The present invention appertains to a safety hitch constructed for use with tractors particularly when the same are utilized for drawing implements such as plows or the like, and which is particularly adapted to automatically separate and thus disconnect the tractor from said implement should an extra heavy load be encountered. By way of example, in plowing, many times, the plow strikes a more or less solid obstruction and in such a contingency the present hitch will automatically operate to disconnect the plow and tractor before any parts of either are broken, or before, as many times has occurred without safety devices of this character, the tractor rises and turns over backwards.

An important object of the invention is to provide a hitch of this nature which is very simple in construction, yet practical and efficient, sure in its operation, inexpensive to construct and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a top plan view of a hitch embodying the features of my invention.

Figure 2 is a side elevation thereof.

Figure 3 is a detail sectional view taken substantially on the line 3—3 of Figure 1.

Figure 4 is a detail section taken substantially on the the line 4—4 of Figure 1.

Figure 5 is an end elevation of the hitch showing the hook in section substantially on the line 5—5 of Figure 1.

Figure 6 is a disassembled view of the upper frame.

Figure 7 is a disassembled view of the lower frame.

Figure 8 is a perspective view showing the forward end of the hitch.

Figure 9 is a perspective view of one of the rods or bolts.

Figure 10 is a detail sectional view taken substantially on the line 10—10 of Figure 1.

Referring to the drawings in detail it will be seen that the numeral 5 denotes an elongated hitch bar on the forward end of which is disposed a spaced parallel lip extension 6 whereby this hitch bar may be attached to a tractor by means of a pin 7 in a more or less conventional manner.

I utilize an upper frame Fa and a lower frame Fb. These frames are constructed of angle iron and each frame includes a pair of members, the upper and lower frame members including elongated portions 9 merging into oblique extensions 10 which, in turn, merge into extensions 11 disposed in parallelism with elongated portions 9. The forward ends of the portions 9 are curved outwardly as indicated at 12. Adjacent the curved out ends 12, the portions 9 are pivotally mounted as at 14 on the bar 5 adjacent the lip 6, the upper frame members being disposed above the bar and the lower frame members below the bar.

Between the terminals of the extensions 11 there are journaled by suitable pin means 15 disks 16. Spring means are provided for holding the members of the frames in the position shown in Figure 1 with the peripheries of the disks 16 in abutment. Since these spring means are identical in construction I shall describe one only in detail. Each spring means includes a rod or bolt 17 threaded on the ends for the reception of the nuts 18 and washers 19. Coil springs 20 are disposed about the rod one to each side of the flanges of the frame members as is shown to advantage in Figure 3 and are tensioned to hold the portions 9 of the upper and lower frames in abutment and thereby holding the disks 16 in abutment as shown in Figure 5 so that the hook 22 or like member of a plow or other implement may be engaged therebetween as shown to advantage in Figures 1 and 4. It will be seen that should the plow implement come into contact with a stone, or like object the resistance will be sufficient to overcome the tension of the springs 20 whereby the tractor may be disconnected from the implement and thereby preventing the breaking of parts of the implement or causing the overturn of the tractor.

It is thought that the construction, utility and advantages of this invention will now be quite apparent without a more detailed description thereof. However, it is desired to point out that the members of the frame are connected intermediate the portions 9 by members 25 as shown to advantage in Figure 10.

Numerous changes in the details of construction and in the combination and arrangement of parts may be resorted to without departing from the spirit or scope of the invention as hereinafter claimed or sacrificing any of its advantages.

Having thus described my invention, what I claim as new is:—

A hitch of the class described comprising, in combination, a hitch bar, means at one end of the hitch bar for engagement with a tractor, a pair of frames, one above and one below the hitch bar, each frame consisting of a pair of members pivotally mounted on the hitch bar adjacent the forward end thereof, spring means associated with the members for normally holding the same in abutment with each other, a pair of disks, and means for rotatably mounting the disks between the rear ends of the members of the frame with a portion of their peripheries thereof normally contacting one another, said frames being of a Y-shaped formation with the rear ends separated, said means for holding members of the frame in abutment being in the form of rods extending through the members of the frame and having coil springs thereon impinging against the members of the frames to hold the same in abutment.

LEONAS O. ORNER.